(12) United States Patent
Manville et al.

(10) Patent No.: US 9,135,011 B2
(45) Date of Patent: Sep. 15, 2015

(54) NEXT BRANCH TABLE FOR USE WITH A BRANCH PREDICTOR

(75) Inventors: David Thomas Manville, Ann Arbor, MI (US); Trevor Nigel Mudge, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 786 days.

(21) Appl. No.: 13/459,386

(22) Filed: Apr. 30, 2012

(65) Prior Publication Data

US 2013/0290679 A1 Oct. 31, 2013

(51) Int. Cl.
G06F 9/32 (2006.01)
G06F 9/38 (2006.01)
G06F 9/30 (2006.01)

(52) U.S. Cl.
CPC ............ *G06F 9/3806* (2013.01); *G06F 9/3005* (2013.01); *G06F 9/324* (2013.01); *G06F 9/3842* (2013.01)

(58) Field of Classification Search
None
See application file for complete search history.

(56) References Cited

U.S. PATENT DOCUMENTS

| 6,560,693 | B1 * | 5/2003 | Puzak et al. | 712/207 |
| 7,082,520 | B2 * | 7/2006 | Bonanno et al. | 712/236 |
| 2005/0120193 | A1 * | 6/2005 | Emma et al. | 712/240 |
| 2010/0037036 | A1 * | 2/2010 | Hum et al. | 712/205 |

OTHER PUBLICATIONS

Seznec et al., "A case for (partially) TAgged GEometric history length branch prediction", *IRISA/INRIA/HIPEAC*, 2006, 23 pages.
A. Seznec, "A 64 Kbytes ISL-TAGE branchpredictor", *INRIA/IRISA*, May 20, 2011, pp. 1-4.
D. Jiminez, "Fast Path-Based Neural Branch Prediction", *36th Annual IEEE/ACM Int'l. Symposium (MICRO-36)*, Dec. 2003, pp. 1-10.

* cited by examiner

*Primary Examiner* — Kenneth Kim
(74) *Attorney, Agent, or Firm* — Nixon & Vanderhye P.C.

(57) ABSTRACT

A data processing system 2 is provided with branch prediction circuitry 20 for performing branch prediction operations. Next branch table circuitry 22 stores data identifying from a given branch instruction what will be the address of the next branch instruction to be encountered within the program flow. This next branch instruction address is supplied to the branch prediction circuitry 20 which uses it to form its prediction prior to that next branch instruction being identified as such by the instruction decoder 16. This permits branch prediction to commence earlier in the branch prediction circuitry 20 than would otherwise be the case.

15 Claims, 5 Drawing Sheets

NBT Consumption

FIG. 6

NEXT BRANCH TABLE FOR USE WITH A BRANCH PREDICTOR

BACKGROUND OF THE INVENTION

1. Field of the Invention

This invention relates to the field of data processing systems. More particularly, this invention relates to data processing systems having a next branch table used to provide a next branch address to branch prediction circuitry.

2. Description of the Prior Art

It is known to provide data processing systems within branch prediction circuitry. Such branch prediction circuitry is important in providing a high performance within data processing systems employing deep pipelines as the penalty involved in a branch prediction is large. As branch predictors have increased in accuracy, there has been a corresponding increase in the size and complexity of those branch predictors and an increase in difficulty in maintaining their speed of operation, i.e. a potential processing bottleneck is the time taken for a branch predictor to return its branch prediction after a branch instruction has been identified. This is particularly the case when the branch predictor generates its prediction in dependence upon the branch instruction address of the branch instruction to be predicted as the branch instruction address will not be known until the branch instruction has been identified as a branch instruction. Measures which can decrease or remove processing bottlenecks from data processing systems are advantageous and can allow other relaxations, such as increasing the processing speed or reducing the circuit area (level of parallelism) needed to achieve a desired processing speed.

SUMMARY OF THE INVENTION

Viewed from one aspect the present invention provides apparatus for processing data comprising:

instruction decoding circuitry configured to decode program instructions, each having an instruction address, to generate control signals for controlling data processing circuitry to perform data processing operations specified by said program instructions;

branch prediction circuitry configured to perform a prediction of a branch outcome of a branch instruction in dependence upon at least an instruction address of said branch instruction; and next branch table circuitry configured to store data identifying for given instruction address in a computer program flow a next branch instruction address of a next branch instruction following said given instruction address within a current pass through said computer program flow; wherein said next branch table circuitry is configured to supply said next branch instruction address to said branch prediction circuitry before said instruction decoding circuitry identifies said next branch instruction as a branch instruction during said current pass; and said branch prediction circuitry is configured to use said next branch instruction address received from said next branch table circuitry to commence prediction of a next branch outcome of said next branch instruction before said instruction decoding circuitry decodes said next branch instruction during said current pass.

The present technique provides next branch table circuitry which stores data identifying for a given instruction address in a computer program flow, the next branch instruction address of a next branch instruction following that given instruction within the computer program flow. Thus, when the given instruction address is reached in the computer program flow, the next branch table circuitry may be used to look up the next branch instruction address and this next branch instruction address can be provided to the branch prediction circuitry such that it may commence its prediction operation before that next branch instruction has been identified as such by the decoding circuitry. This gives extra time for the branch prediction circuitry to perform its prediction operation thereby permitting faster operation and/or a more compact branch prediction circuitry implementation. The next branch table circuitry stores information regarding previous traverses of the computer program in which the branch instructions have been identified and stores data identifying the instruction addresses of these previously identified branch instructions but indexed under a preceding address.

When the given instruction is a branch instruction that immediately precedes the next branch instruction in the computer program flow, there will be no intervening branch instructions and accordingly once the branch instruction has been reached, then the program flow will inevitably (excluding events such as interrupts) reach the next branch instruction and accordingly the next branch table can be used to initiate the prediction using the previously stored identification of the next branch instruction address with little risk of this being wasted processing effort.

In addition to generating its prediction in dependence upon the next branch instruction address, the prediction circuitry may also perform its prediction of the branch outcome in dependence of a history value representing a sequence of preceding branch outcomes. Generating a prediction of a branch outcome in dependence upon a combination of branch instruction address and history value provides improved prediction accuracy.

The branch prediction circuitry may be configured to generate a hash value in dependence upon the history value and the next branch instruction address. This hash value may be used to identify a storage location within the branch prediction circuitry of the prediction of the branch outcome being sought.

In some embodiments the branch prediction may be configured to perform a plurality of predictions of the branch outcome with each of the plurality of predictions being dependent upon the next branch instruction address value and a respective history value representing different lengths of sequences of branch outcomes. Thus, for example, the next branch instruction address value may be hashed with first a history value of a first length and then with a second history value of a second different length to generate two hash values which are used to look up respective predictions by the branch prediction circuitry.

In some embodiments the plurality of predictions may be performed in parallel using respective different prediction tables stored within the branch prediction circuitry. This increases prediction speed, but consumes additional circuit area.

In other embodiments the plurality of predictions may be performed in series using a shared prediction table. This can consume less circuitry area, but will tend to increase the time taken to generate the prediction. The use of the next branch table to allow the prediction to commence earlier facilitates use of a system in which a plurality of predictions are performed in series as a longer time will be permitted for this series of predictions to be performed.

When a shared prediction table is utilised, there is an increased likelihood of aliasing between predictions that could reduce prediction accuracy. This problem may be addressed by forming the shared prediction table as an associative memory such that a given branch prediction can be stored in any of a plurality of different storage locations within the shared branch prediction table. This reduces the likelihood of pathological situations in which prediction data is repeatedly evicted due to aliasing in a manner which reduces prediction accuracy.

The branch prediction circuitry may be configured to generate a plurality of hash values in dependence upon a plurality of history values of different lengths and the next branch instruction address as previously discussed. In this context, when a shared prediction table is utilised it is convenient that the plurality of different hash values have the same length as this makes more efficient use of the resources of the shared prediction table.

The generation of the data populating the next branch table circuitry can be performed in a variety of different ways. In some embodiments, the next branch table circuitry is configured to store data identifying a source branch instruction address when this is encountered within the computer program flow and then when the next branch instruction following the source branch instruction is encountered in the computer program flow to store data identifying the next branch instruction address in association with the source branch instruction address. Thus, the source branch instruction address becomes the given address, or branch instruction address, referred to above and the next branch instruction address is stored in a manner that can be accessed using that given address.

In some embodiments when the instruction decoder decodes a decoded branch instruction, a decoded branch instruction address of the decoded branch instruction is supplied to the next branch table circuitry and is compared with stored source branch instruction addresses to identify any stored next branch instruction address. The branch instruction address of a decoded branch instruction can thus be used to, for example, index into the next branch table and provide a tag which is compared with a tag stored in the next branch table to determine whether or not there is a hit with an already stored identification of a next branch instruction address that can then be provided to the branch prediction circuitry such that it may commence its branch prediction operations.

The efficiency of storage within the next branch table may be improved when the next branch table is configured to store data identifying the next branch instruction address as an offset from an instruction address of the given instruction. A next branch instruction will typically follow relatively soon after a given instruction and accordingly bit space may be saved by identifying this next branch instruction address using an offset value as the given instruction address will already be known and can be used together with the offset to calculate the next branch instruction address.

The accuracy with which the next branch table provides the correct next branch instruction address may be improved when the next branch table is configured to store data identifying an outcome of the preceding branch instruction (known when this was resolved) such that this outcome together with the address of the branch instruction identify a next branch instruction address. This provides the option for two next branch instruction addresses to be stored by the next branch table circuitry for a given preceding branch instruction address with these two next branch instruction addresses corresponding to different outcomes of the preceding branch instruction.

Viewed from another aspect the present invention provides apparatus for processing data comprising:

instruction decoding means for decoding program instructions, each having an instruction address, to generate control signals for controlling data processing means for performing data processing operations specified by said program instructions;

branch prediction means for performing a prediction of a branch outcome of a branch instruction in dependence upon at least an instruction address of said branch instruction; and next branch table means for storing data identifying for given instruction address in a computer program flow a next branch instruction address of a next branch instruction following said given instruction address within a current pass through said computer program flow; wherein said next branch table means is configured to supply said next branch instruction address to said branch prediction means before said instruction decoding means identifies said next branch instruction as a branch instruction during said current pass; and said branch prediction means is configured to use said next branch instruction address received from said next branch table means to commence prediction of a next branch outcome of said next branch instruction before said instruction decoding means decodes said next branch instruction during said current pass.

Viewed from a further aspect the present invention provides a method of processing data comprising the steps of:

decoding program instructions, each having an instruction address, to generate control signals for controlling data processing operations specified by said program instructions;

performing a prediction of a branch outcome of a branch instruction in dependence upon at least an instruction address of said branch instruction; and storing data identifying for given instruction address in a computer program flow a next branch instruction address of a next branch instruction following said given instruction address within a current pass through said computer program flow; wherein supplying said next branch instruction address for use in said step of performing said prediction before said step of decoding identifies said next branch instruction as a branch instruction during said current pass; and using said next branch instruction address received to commence prediction of a next branch outcome of said next branch instruction before said step of decoding decodes said next branch instruction during said current pass.

The above, and other objects, features and advantages of this invention will be apparent from the following detailed description of illustrative embodiments which is to be read in connection with the accompanying drawings.

DESCRIPTION OF THE EMBODIMENTS

Figure 1:
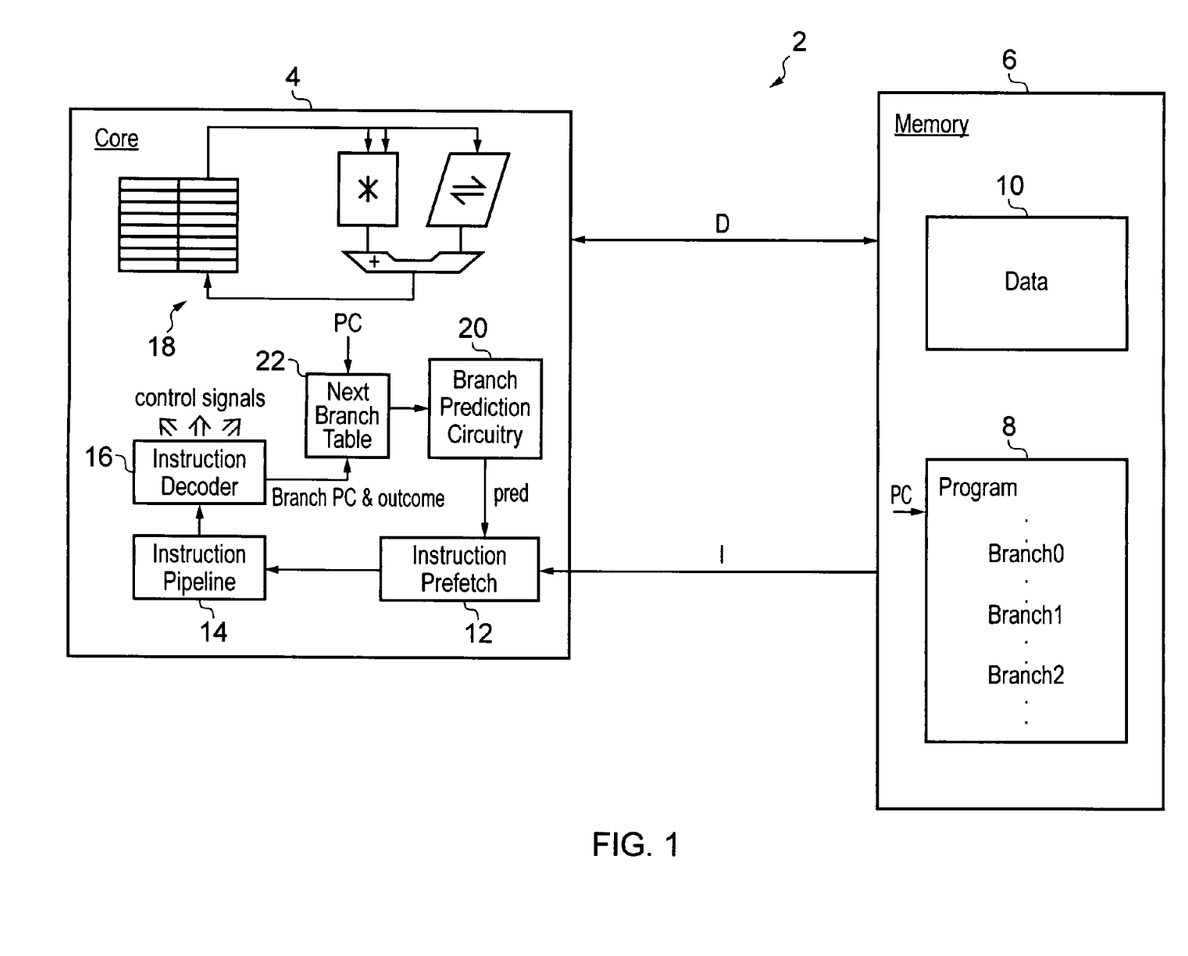
FIG. 1 schematically illustrates a data processing apparatus incorporating branch prediction circuitry and a next branch table.

FIG. 1 schematically illustrates a data processing apparatus 2 in the form of a processor core 4 coupled to a memory 6 which stores program instructions 8 and data to be manipulated 10. The program instructions 8 include branch instructions which are traversed (executed) as the program is executed and the computer program flow is followed.

The program instructions from the memory 6 are supplied to an instruction prefetch unit 12 from where they pass into an instruction pipeline 14. One stage in the instruction pipeline 14 includes an instruction decoder 16 which serves to generate control signals which control processing circuitry 18 to perform data processing operations as specified by the decoded program instructions. It will be appreciated that decoding operations to produce the control signals as illustrated in FIG. 1 may be preceded by other decoding operations which generate intermediate program instructions, e.g. the decoding of architectural instructions into micro-operation instructions, with these micro operation instructions then being subsequently decoded by the instruction decoder 18 to generate the control signals which actually control the data processing circuits 18.

Also illustrated in FIG. 1 are branch prediction circuitry 20 and next branch table circuitry 22. The next branch table circuitry 22 is responsive to the identification of branch instructions by the instruction decoder 16 and subsequently the outcome of those branch instructions to store within the next branch table circuitry 22 data identifying from a given branch instruction (which may be identified by its instruction address) and outcome, the address of the next branch instruction within the computer program flow (which may be identified as an offset value from the given branch instruction address). Thus, as the computer program flow is followed, data is accessed representing for each branch instruction encountered, what will be the instruction address of the next branch instruction that will be encountered if the previous program flow is followed. The provides earlier identification of this next branch instruction address which can be supplied to the branch prediction circuitry 20 permitting the branch prediction circuitry 20 to start its prediction operations before that next branch instruction is identified as such by the instruction decoder 16 as it passes through the instruction pipeline 14 on its current pass. The branch prediction generated by the branch prediction circuitry 20 is supplied to the instruction prefetch unit 12 in order to direct the instruction prefetch circuit 12 to fetch the appropriate instructions and is used to guide the issue of instructions from the instruction prefetch unit 12 into the instruction pipeline 14.

Figure 2:
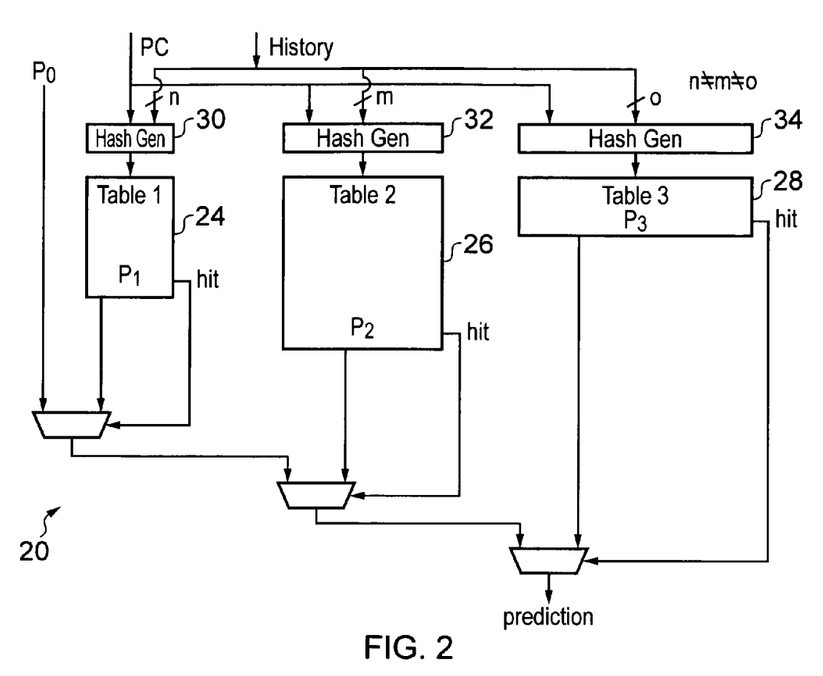
FIG. 2 illustrates one example of branch prediction circuitry which may be used in combination with the next branch table circuitry.

FIG. 2 illustrates one example form of branch prediction circuitry 20 that may be used in conjunction with the present technique. In this branch prediction circuitry 20 there are provided a plurality of branch prediction tables 24, 26, 28. Each of these branch prediction tables 24, 26, 28 is accessed in dependence upon a hash value generated by a respective hash generator 30, 32, 34. These different hash values have different lengths and are generated depending upon different lengths of history value (sequences of previous branch outcomes). The hash value is a combination of a selected portion of the history value together with the instruction address (PC) of the branch instruction for which a prediction is being made (the next branch instruction as this next branch instruction address has been identified early by the next branch table 22). In the example of FIG. 2, each branch table 24, 26, 28 may produce its own prediction and the branch prediction circuitry 20 may select between these in order of priority in order to produce a final prediction for use by the data processing system 2.

Figure 3:
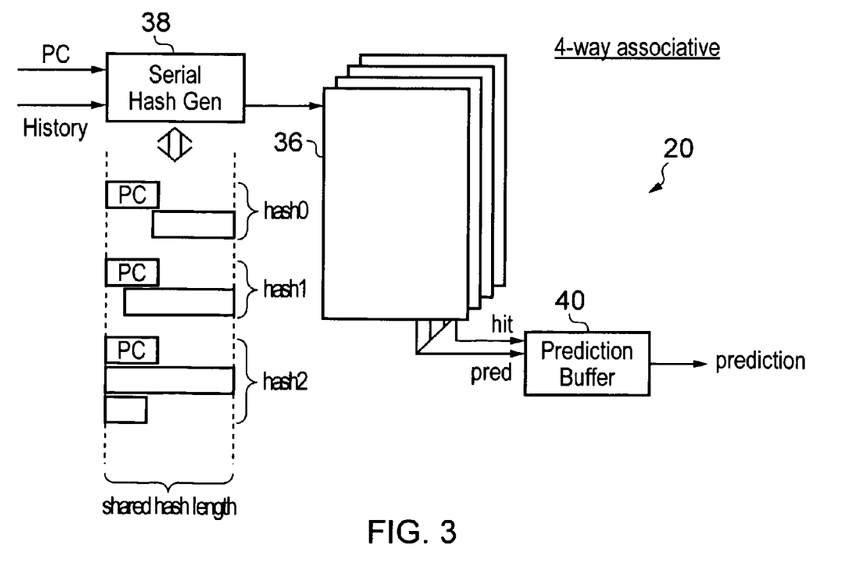
FIG. 3 illustrates a further example of branch prediction circuitry that may be used in combination with the next branch table circuitry.

FIG. 3 schematically illustrates another example of branch prediction circuitry 20 that may be utilised with the next branch table circuitry 22. In the example of FIG. 3, a shared prediction table 36 is stored within a four-way associative memory. Serial hash generation circuitry 38 is responsive to data identifying the next branch instruction address together with a history value to generate a sequence of hash values, each of these hash values utilising a different length history value. These hash values are in turn used to look up predictions within the shared prediction table 36. The predictions generated are supplied to prediction buffer circuitry 40 where they are combined. The predictions may have an order of priority, similar to that discussed in relation to FIG. 2, and a highest priority prediction identified may be used. Other possibilities include combining the predictions to produce a weighted prediction, such as voting between the predictions. Different predictions may be weighted in different ways to contribute towards such a voting arrangement.

It will be appreciated that the example branch prediction circuitry illustrated in FIGS. 2 and 3 are only two possible examples of the branch prediction circuitry 20 that may be utilised. Both these examples of branch prediction circuitries 20 perform their prediction with a dependence upon the next branch prediction address. The serial prediction process of FIG. 3 inherently has greater latency associated with it and so will benefit more from the early provision of the next branch instruction address as enabled by the next branch table circuitry 22.

Figure 4:
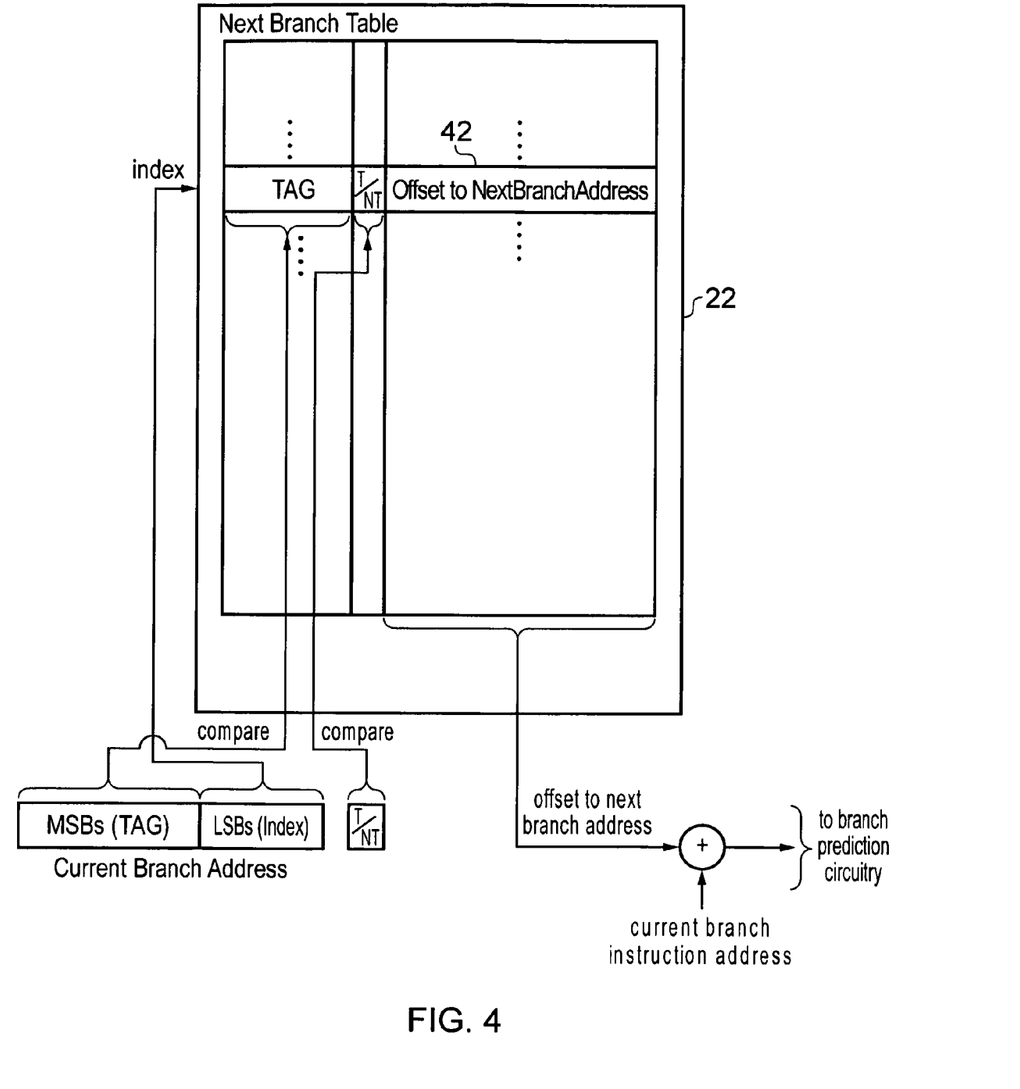
FIG. 4 illustrates the data stored within the next branch table circuitry and how this may be accessed.

FIG. 4 schematically illustrates one example of the next branch table circuitry 22. This is shown as a single flat memory which is indexed by a least significant portion of a current branch instruction address. Other embodiments, such as associative memories, content addressable memories and the like are also possible. A current branch instruction address is used to identify an entry 42 within the next branch table 22 that stores an offset value from the current branch instruction address to the next branch instruction address. As mentioned, the least significant bits of the current branch instruction address provide an index value into the next branch table circuitry 22. This identifies a particular storage location within the next branch table circuitry 22. At this storage location the most significant bits of the current branch instruction address may be compared with a stored tag value at the storage location 42 to determine if there is a match. Furthermore, a branch outcome of the current branch instruction provided in combination with the current branch instruction address may also be compared with a stored branch outcome associated with the storage location 42 to determine the match. If there is a hit within the next branch table circuitry 22, then the offset to the next branch instruction address may be combined with the current branch instruction address to produce a full next branch instruction address which is supplied to the branch prediction circuitry 20 for use as illustrated in FIGS. 2 and 3.

Figure 5:
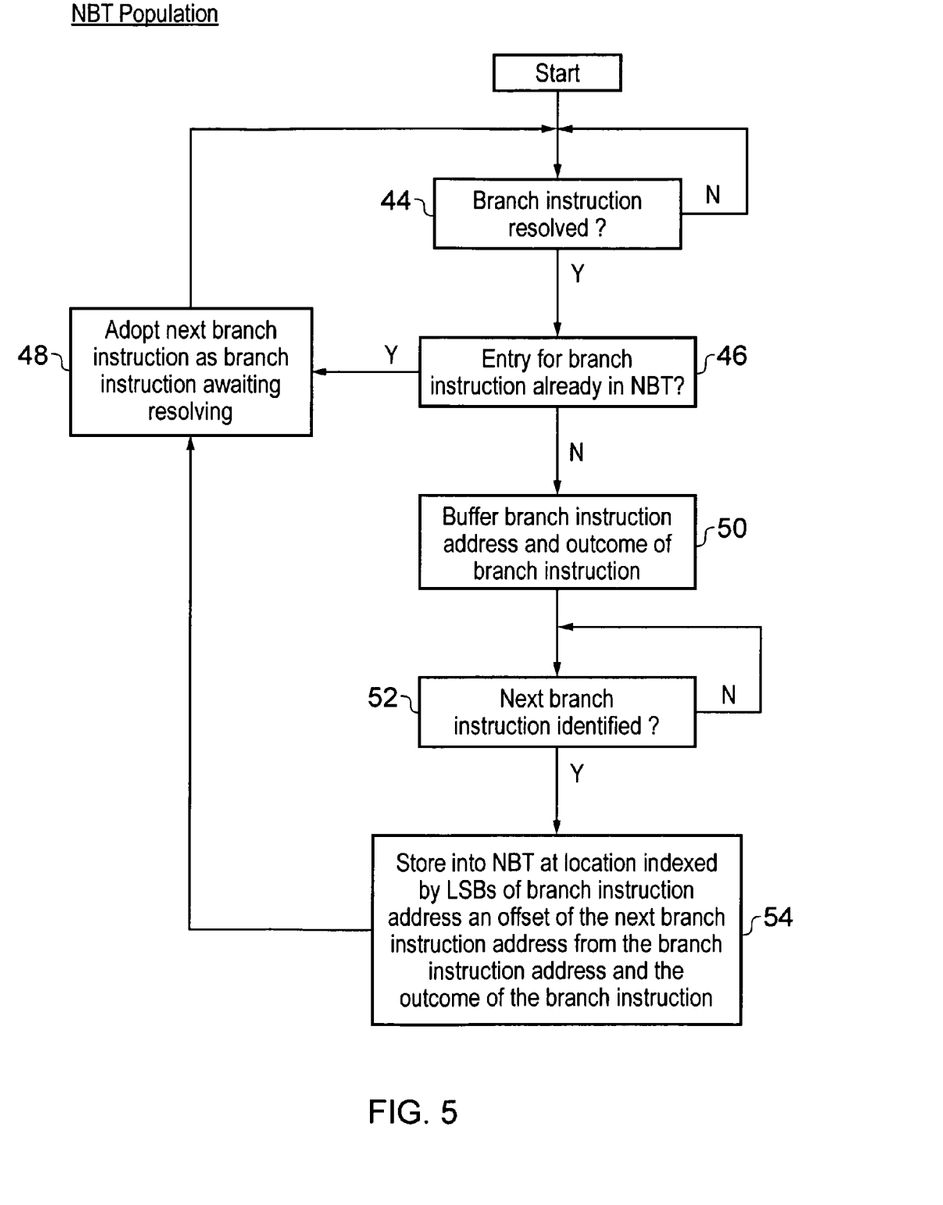
FIG. 5 is a flow diagram schematically illustrating the operations which populate the next branch table circuitry.

FIG. 5 is a flow diagram schematically illustrating the operations which populate the next branch table 22. At step 44 processing waits until a branch instruction is resolved. Step 46 then determines whether there is an entry for that resolved branch instruction already stored within the next branch table circuitry 22. If there is an entry already stored within the next branch table circuitry 22, then processing proceeds to step 48 where the next branch instruction is adopted as the branch instruction awaiting resolving as tested at step 44 and processing is returned to step 44.

If the determination at step 46 was that there is no existing entry for the branch instruction resolved at step 44 in the next branch table circuitry 22, then step 50 serves to buffer (temporarily store) the branch instruction address and the outcome of the branch instruction that was resolved at step 44. Step 52 waits until the next branch instruction is identified. This branch instruction is identified within the instruction decoder 16. It is not necessary to wait until the outcome of this next branch instruction has been resolved. Processing proceeds to step 54 where into a storage location identified within the next branch table circuitry 22 by the least significant bits of the branch instruction address buffered at step 50, an offset to the next branch instruction address of the next branch instruction identified at step 52 is stored together with the outcome of the branch instruction identified at step 44. Processing is passed to step 48 where the next branch instruction for which data has just been stored into the next branch table 22 at step 54 is then treated as the branch instruction awaiting resolving at step 44.

Figure 6:
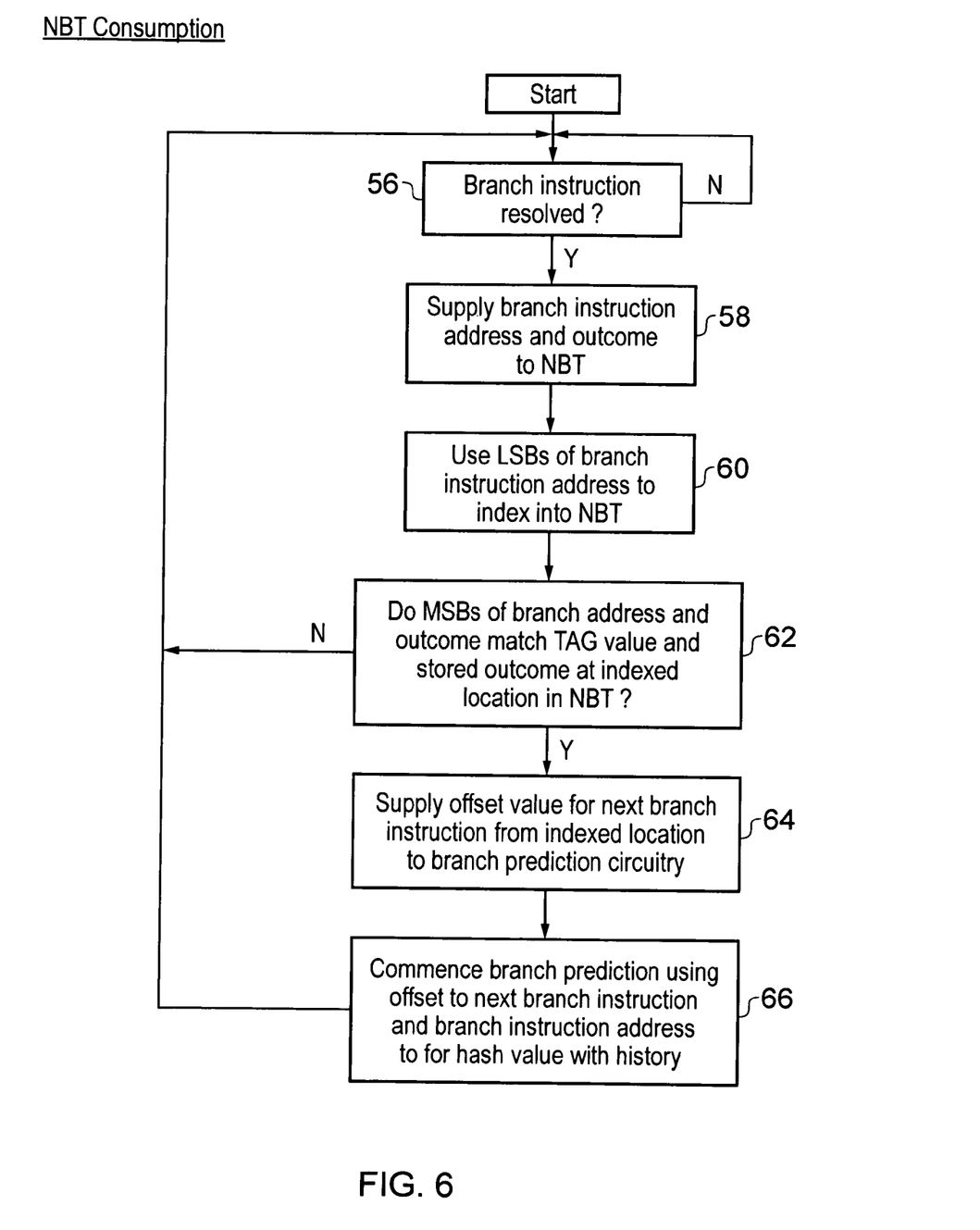
FIG. 6 is a flow diagram schematically illustrating the operations which consume data stored within the next branch table circuitry.

FIG. 6 schematically illustrates the consumption of data stored within the next branch table 22. At step 56 processing waits until a branch instruction is resolved. Step 58 then supplies the branch instruction address and the outcome of that branch instruction, to the next branch table 22. Step 60 uses the least significant bits of the branch instruction address to index into a storage location within the next branch table 22. Step 62 determines whether the most significant bits of the branch address and the outcome of the branch instruction match the stored tag value and the stored outcome at the indexed location in the next branch table 22. If there is no match, then processing returns to step 56. If there is a match, then processing proceeds to step 64. At step 64 the offset value at the storage location identified in step 60 is combined with the instruction address of the branch instruction resolved at step 56 to generate a next branch instruction address that is passed to the branch prediction circuitry 20. At step 66 the branch prediction circuitry 20 commences branch prediction using this next branch instruction address to form a hash value in combination with a history value supplied to the branch prediction circuitry 20.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
   instruction decoding circuitry configured to decode program instructions, each having an instruction address, to generate control signals for controlling data processing circuitry to perform data processing operations specified by said program instructions;
   branch prediction circuitry configured to perform a prediction of a branch outcome of a branch instruction in dependence upon at least an instruction address of said branch instruction; and
   next branch table circuitry configured to store data identifying for given instruction address in a computer program flow a next branch instruction address of a next branch instruction following said given instruction address within a current pass through said computer program flow; wherein
   said next branch table circuitry is configured to supply said next branch instruction address to said branch prediction circuitry before said instruction decoding circuitry identifies said next branch instruction as a branch instruction during said current pass; and
   said branch prediction circuitry is configured to use said next branch instruction address received from said next branch table circuitry to commence prediction of a next branch outcome of said next branch instruction before said instruction decoding circuitry decodes said next branch instruction during said current pass.

2. Apparatus as claimed in claim 1, wherein said given instruction address is an address of a branch instruction and said next branch table circuitry is configured to store for said branch instruction address a next branch instruction address within said computer program flow.

3. Apparatus as claimed in claim 1, wherein said branch prediction circuitry is configured to perform said prediction of said branch outcome in dependence of a history value representing a sequence of preceding branch outcomes.

4. Apparatus as claimed in claim 3, wherein said branch prediction circuitry is configured to generate a hash value in dependence upon said history value and said next branch instruction address and to use said hash value to identify a storage location within said branch prediction circuitry of said prediction of said branch outcome.

5. Apparatus as claimed in claim 3, wherein said branch prediction circuitry is configured to perform a plurality of predictions of said branch outcome, each of said plurality of predictions being dependent upon said next branch instruction address value and a respective history value representing a different length sequence of branch outcomes.

6. Apparatus as claimed in claim 5, wherein at least some of said plurality of predictions are performed in parallel using respective different prediction tables stored within said branch prediction circuitry.

7. Apparatus as claimed in claim 5, wherein at least some of said plurality of predictions are performed in series using a shared prediction table stored within said branch prediction circuitry.

8. Apparatus as claimed in claim 7, wherein said shared prediction table is configured as an associative memory such that given branch prediction can be stored in any of a plurality of different storage locations within said shared branch prediction table.

9. Apparatus as claimed in claim 8, wherein
   said branch prediction circuitry is configured to generate a plurality of hash values in dependence upon said plurality of history values of different lengths and said next branch instruction address and to use said plurality of hash value to identify storage locations within said shared prediction table of respective predictions of said branch outcome; and
   said plurality of hash values have a same length.

10. Apparatus as claimed in claim 1, wherein said next branch table circuitry is configured to store data identifying an source branch instruction address of a source branch instruction encountered within said computer program flow and when said next branch instruction following said source branch instruction is encountered in said computer program flow to store data identifying said next branch instruction address in association with said source branch instruction address.

11. Apparatus as claimed in claim 10, wherein, when said instruction decoder circuitry decodes a decoded branch instruction, a decoded branch instruction address of said decoded branch instruction is supplied to said next branch table circuitry and said decoded branch instruction address is compared by said next branch table circuitry with stored source branch instruction addresses stored by said next branch table circuitry to identify any stored next branch instruction address.

12. Apparatus as claimed in claim 1, wherein said next branch table is configured to store data identifying said next branch instruction address as an offset from an instruction address of said given instruction.

13. Apparatus as claimed in claim 2, wherein said next branch table is configured to store data identifying an outcome of said branch instruction, said outcome and said address of said branch instruction together identifying said next branch instruction address.

14. Apparatus for processing data comprising:
instruction decoding means for decoding program instructions, each having an instruction address, to generate control signals for controlling data processing means for performing data processing operations specified by said program instructions;
branch prediction means for performing a prediction of a branch outcome of a branch instruction in dependence upon at least an instruction address of said branch instruction; and
next branch table means for storing data identifying for given instruction address in a computer program flow a next branch instruction address of a next branch instruction following said given instruction address within a current pass through said computer program flow; wherein
said next branch table means is configured to supply said next branch instruction address to said branch prediction means before said instruction decoding means identifies said next branch instruction as a branch instruction during said current pass; and
said branch prediction means is configured to use said next branch instruction address received from said next branch table means to commence prediction of a next branch outcome of said next branch instruction before said instruction decoding means decodes said next branch instruction during said current pass.

15. A method of processing data comprising the steps of:
decoding program instructions, each having an instruction address, to generate control signals for controlling data processing operations specified by said program instructions;
performing a prediction of a branch outcome of a branch instruction in dependence upon at least an instruction address of said branch instruction; and
storing data identifying for given instruction address in a computer program flow a next branch instruction address of a next branch instruction following said given instruction address within a current pass through said computer program flow; wherein
supplying said next branch instruction address for use in said step of performing said prediction before said step of decoding identifies said next branch instruction as a branch instruction during said current pass; and
using said next branch instruction address received to commence prediction of a next branch outcome of said next branch instruction before said step of decoding decodes said next branch instruction during said current pass.

* * * * *